Inventor
Ferdinand W. Seeck
By T. J. Geisler
and F.R. Geisler.
Attorneys

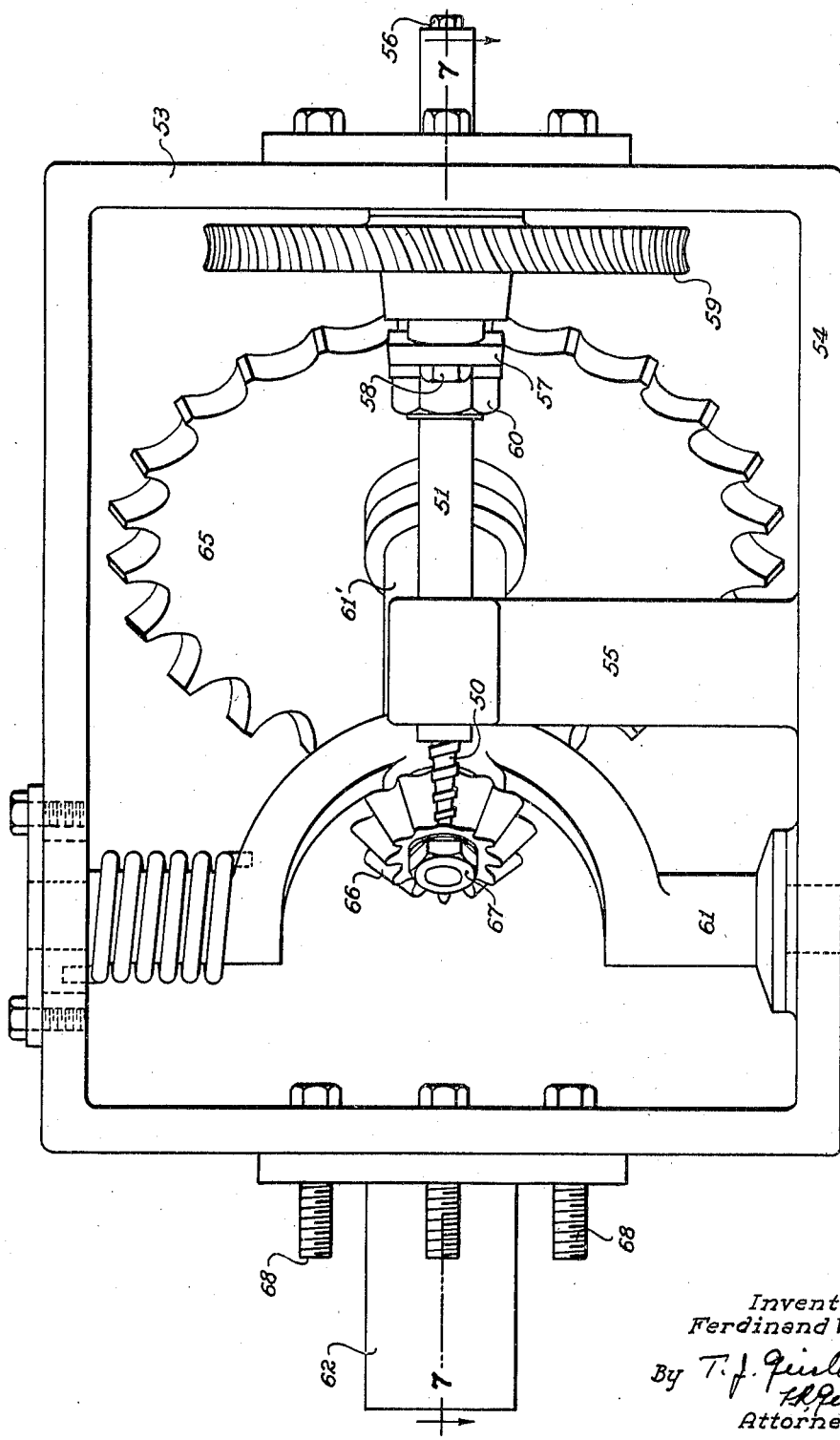

Patented July 13, 1943

2,324,242

UNITED STATES PATENT OFFICE 2,324,242

MACHINE FOR CUTTING GEAR TEETH

Ferdinand W. Seeck, Lebanon, Oreg.

Application October 21, 1939, Serial No. 300,568

8 Claims. (Cl. 90—2)

This invention relates to an improved means for cutting teeth of special form on gears, especially bevel gears, and relates in particular to the cutting of completely rounded teeth on such gears. In my attempts to produce bevel gears with rounded teeth such, for example, as the bevel gears which I prefer to use in the differential mechanism described in my United States Letters Patent No. 2,158,157, issued under date of May 16, 1939, I have found it very difficult, expensive, and impracticable, to produce such rounded teeth on bevel gears by following conventional methods and employing conventional gear-cutting machines.

In gear-cutting devices at present in common use, it is customary to have the blank, from which the gear is to be cut, supported for intermittent rotation on a fixed axis, and to have the axis on which the cutter moves fixed with respect to the axis of the blank, the relative position of the axes of the blank and cutter remaining constant during the entire cutting operation. The mechanism, in such gear-cutting devices, which synchronizes the action of the cutter with the intermittent partial rotation of the blank, thus produces merely a reciprocation of the cutter across the blank at certain spaced intervals. In order to produce rounded teeth on these devices, it is necessary to provide specially shaped cutters, and furthermore, a different cutter is required for every slight variation in shape, size or depth of gear teeth.

As a result of my efforts to cut teeth of a special form, and, in particular, rounded teeth, on a bevel gear, by employing ordinary gear-cutting machines, it occurred to me that by employing a rotating cutter and changing the relative positions of the axes of the blank and of the cutter during the actual cutting operation, it would be possible to produce endless variations in size, shape, and depth of the teeth with the same cutter. After considerable experiment I found that this change of relative positions of the axes could be very simply and satisfactorily controlled by using a pattern, or template gear, making the movement of one of the axes conform to the pattern while the other axis remained fixed.

The object of this invention accordingly is to provide an improved machine for cutting gear teeth, and particularly teeth in bevel gears, in which the same cutter may be used for teeth of different sizes.

I have also discovered that the use of a tapered spiral cutter is advantageous in cutting gear teeth, but that it is impossible to use such a cutter in ordinary gear-cutting machines. A further object of my invention therefore is to provide a gear-cutting apparatus which will carry out my method and in which a tapered spiral cutter may be employed.

These and incidental objects I have been able to attain by the use of a comparatively simple machine, hereinafter described with reference to the accompanying drawings, in which the position of the axis of the blank has been made adjustable with respect to the cutter axis, and in which change in position of the blank axis during the cutting is controlled by simple means, including a template gear or pattern, through the medium of which both rotation of the blank and change in the relative position of the blank axis with respect to the cutter axis will take place.

In the drawings:

Fig. 5 is a detached view of a completed gear;

Fig. 6 is a side elevation of a modified form of my invention; and

Figure 1:
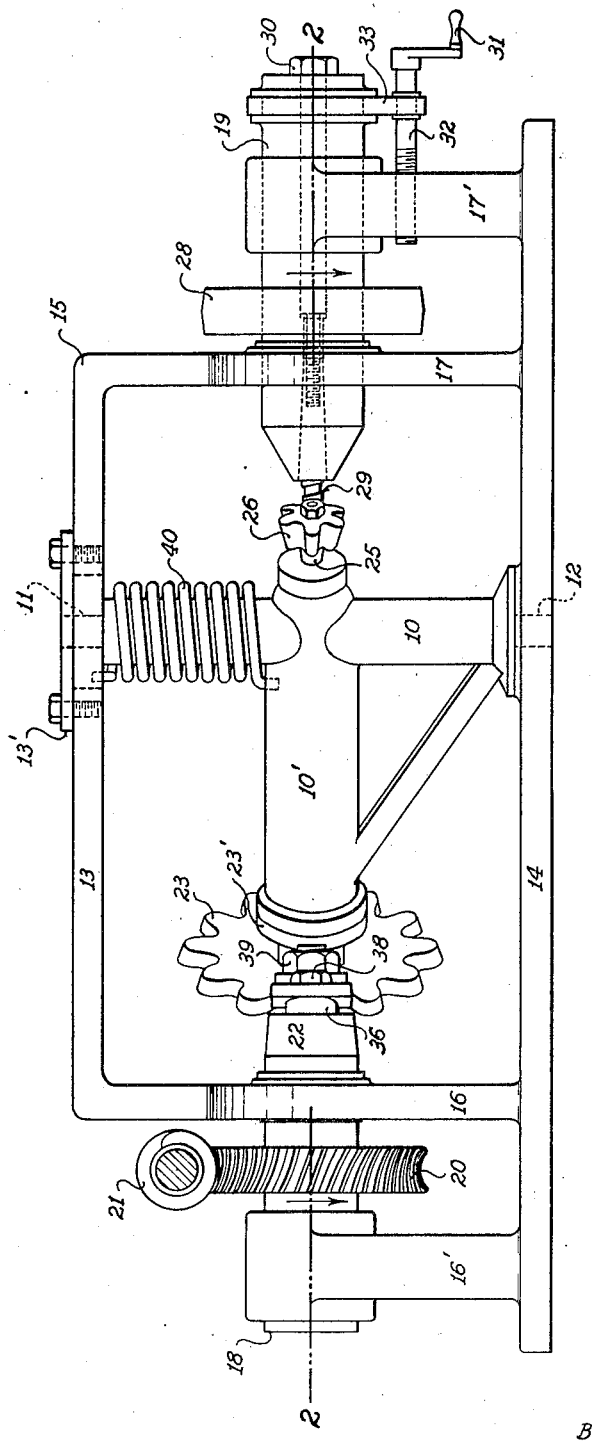
Fig. 1 is a side elevation of my gear-cutting machine.

With reference first to Fig. 1, a T-shaped element, comprising a vertical column 10 and a laterally extended arbor 10', is adapted to swing in a horizontal plane on shaft portions 11 and 12 (shown dotted) journaled in suitable bearings disposed in a removable flanged plate 13', set in the top member 13, and in the bottom member 14 respectively, of a rigid frame 15 shaped substantially as shown. The parallel end walls 16 and 17 of this fixed frame are concentrically bored in alignment with each other and with upstanding bearing pedestals 16' and 17' to serve as journals for a rotor shaft 18 and a tool holder shaft 19 respectively.

The rotor shaft 18 is adapted to be slowly rotated by virtue of a worm gear 20 and worm 21 connected to any convenient driving means, said shaft carrying a rotor 22 which successively engages alternate teeth of a template gear or pattern 23 secured on a spindle 24 (Fig. 2) journaled in the arbor 10' of the T-shaped element 10 as will presently be more specifically described.

Figure 2:
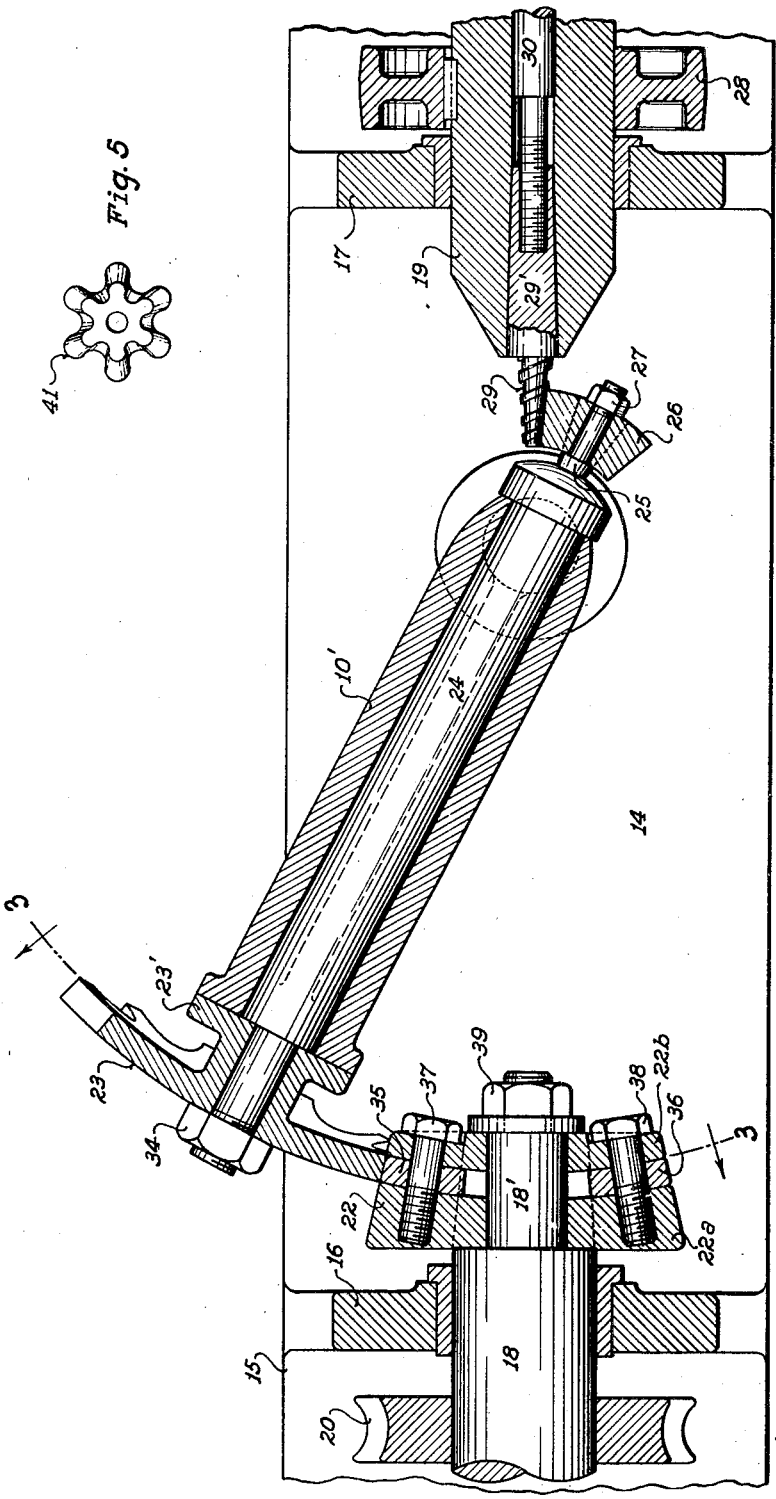
Fig. 2 is a fragmentary sectional plan taken on line 2—2 of Fig. 1 and drawn to a slightly larger scale.

The opposite end of the spindle 24 is shouldered as at 25 and has a stem of reduced diameter on which is mounted the small bevel gear or pinion 26 which the machine is designed to form, a nut 27 threaded on the stem serving to clamp said pinion securely on the spindle 24 against the shoulder 25. If desired a key (not shown) may also be provided to secure the pinion to the spindle. The tool holder shaft 19 is adapted to be rotated at relatively high speed by suitable driving means (not shown) connected to the belt pulley 28 which is keyed to said shaft. Fitted in the inwardly extending end of the shaft 19 is a tapered spiral milling tool 29 having an oppositely tapered shank 29' which is internally threaded to receive a long cap screw 30, (Fig. 2). The head of the cap screw 30 bears on the outer end of the shaft 19 (Fig. 1), and thus constitutes means for drawing the tool 29 tightly against its tapered seat in shaft 19. A crank 31, secured to a screw 32 threaded through the pedestal 17' and journaled in the depending portion of a yoke 33 freely disposed between collars on the shaft 19, constitutes means for axially sliding the shaft 19, and thus the tool 29, toward or away from the gear 26, which the machine is designed to form, and so varying the cutting depth of the milling tool 29 with respect to the gear 26.

The template gear or pattern 23 is a dished gear formed with a planar hub 23', which is flanged to seat against the machined end of the swingable arbor 10', and the pattern 23 is firmly clamped on the spindle 24 by a nut 34 threaded on the extended portion thereof, (Fig. 2). If desired, the pattern could be keyed to the spindle 24. This pattern has twice as many teeth as is required to be formed on the gear 26 and the chordal distance on the pitch line between the centers of adjacent teeth on the pattern bears the same relation to twice the chordal distance between the teeth of the required pinion as the relation between their distances from the axis of the column 10. Thus, when the pattern is caused to rotate by means which engage the teeth thereof, the spindle 24 will transmit such motion to the gear 26 in such manner that equally spaced teeth will be produced in the gear 26 by the operation of the milling tool 29, provided that the gear 26 is swung alternately toward and away from the axis of the tool 29 during such rotation to allow the tool 29 to ride over the tops of the teeth. This is accomplished by means of the rotor 22 cooperating with the pattern 23.

The rotor 22, (Figs. 2 and 4), consists of two plates (22a and 22b), which have their inner surfaces curved to correspond with the curvature of the pattern 23 and are spaced apart a distance slightly in excess of the thickness of the pattern by discs 35 and 36 held in place by cap screws 37 and 38 respectively, the entire assembly being securely positioned on the stem 18' of the rotor shaft 18 by a nut 39. The diameters of the discs 35 and 36 are made equal to the diameter of the stem 18' and such that these three members will fit snugly in the curved space between the teeth of the template gear or pattern 23. Furthermore, the distance on center line between each of the discs and the shaft stem is made to exactly coincide with the chordal distance between adjacent teeth of the template gear or pattern. A torsion spring 40 (Fig. 1), disposed on the column 10 and anchored to the bearing plate 13' in the top frame member 13 and to the arbor 10' exerts a constant thrust on the template gear or pattern 23 toward the rotor shaft stem 18'.

Figure 4:
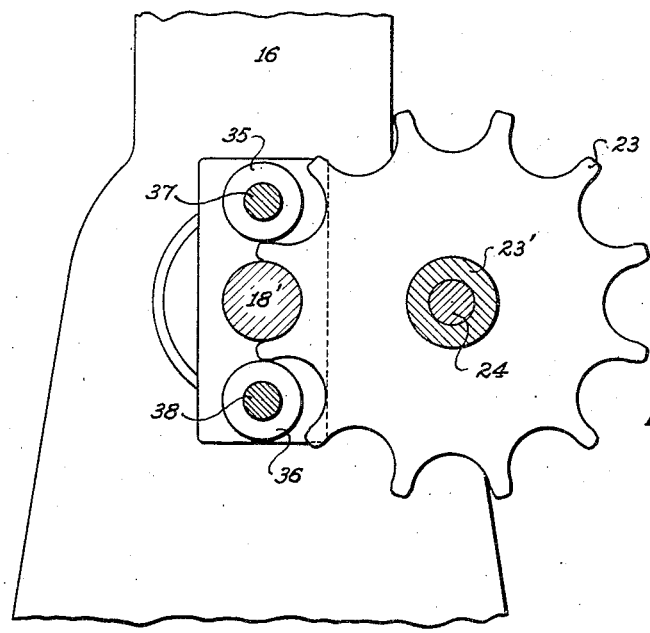
Fig. 4 is a similar view showing the parts in a succeeding operative position.

From Figure 4, it will now be apparent why the template or pattern is made with twice as many teeth as the number desired to be cut on the gear blank. The stem 18' itself does not cause any turning of the template or pattern, but holds the pattern to the proper pitch line between successive engagements of the discs 35 and 36 of the rotor alternately with every second tooth of the pattern. In other words, half of the teeth of the pattern are used for cooperating with the revolving discs 35 and 36 to produce the combined rotation of the pattern and uniform reciprocal motion of its axis, while every other tooth of the pattern cooperates with the stem 18' of the rotor to hold the pattern, and therewith the gear blank, to the proper pitch circle and thus insures proper uniform depth of the teeth which are cut into the blank.

Figure 3:
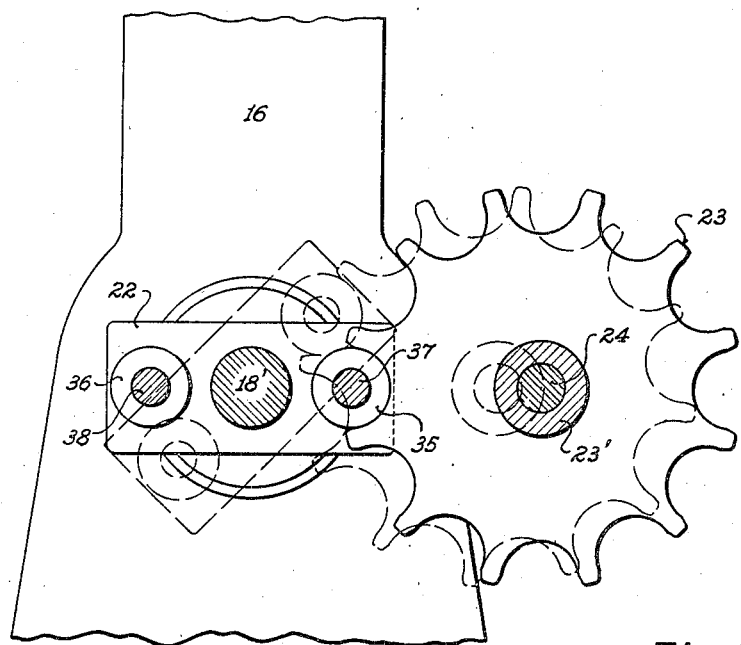
Fig. 3 is a developed section taken on the curved plane corresponding to the line 3—3 of Fig. 2.

In operation, a pinion blank, which has previously been machined to the proper shape, is clamped on the spindle 24, against the shoulder 25. Let it be assumed, for example, that it is desired to cut six teeth of the rounded form shown in Fig. 5 in this blank. A pattern or template gear having twelve teeth is next mounted on the other end of the spindle and the shafts 18 and 19 caused to rotate. Coincident with the high-speed rotation of the milling tool 29, the slowly driven rotor 22, due to the engagement of its discs with the pattern 23, will rotate the pattern, and with it, the pinion blank, since both pattern and blank are secured to the spindle 24. During such rotation of the pattern, the arbor 10' is swung slowly so that the pinion blank will be alternately moved toward and away from the cutting tool 29, the pattern continuing to rotate while the arbor is swinging. This dual function of the rotor 22 will be obvious by reference to Figs. 3 and 4. In the full line position of the rotor and template gear or pattern 23, shown in Fig. 3, the discs 35 and 36 and the stem 18' are in alignment with the spindle shaft 24 and the template gear or pattern 23 is in its most remote position relative to the stem 18'. The cutting tool 29 will now bear on the periphery of the pinion blank, for example, on the part indicated by the reference character 41 in Fig. 5. Rotation of the stem 18' and rotor 22 allows the torsion spring 40 to force the pattern 23 toward the stem 18', as illustrated in broken outline in Fig. 3, until the pattern 23 finally engages the stem 18' as shown in Fig. 4. The tool 29 will now be operating at the root of a tooth in the pinion blank. Further rotation of the rotor swings the disc 36 into contact with the next tooth of the pattern 23 and gradually moves the pattern again away from the stem 18' (at the same time turning the pattern), until the pattern is again brought into the full line position of Fig. 3, whereupon the cycle is repeated. Thus the pinion blank is swung alternately from peripheral contact with the cutting tool to tooth-depth engagement therewith and is simultaneously rotated with respect to said tool. The finished product of this motion is the round tooth bevel gear shown in Fig. 5. Rounded teeth may be cut in a wide range of sizes and numbers of teeth on my machine providing that corresponding template gears or patterns are used and that the chordal pitch remains constant, and even this may be varied by suitably modifying the spacing of the discs of the rotor.

Figure 7:
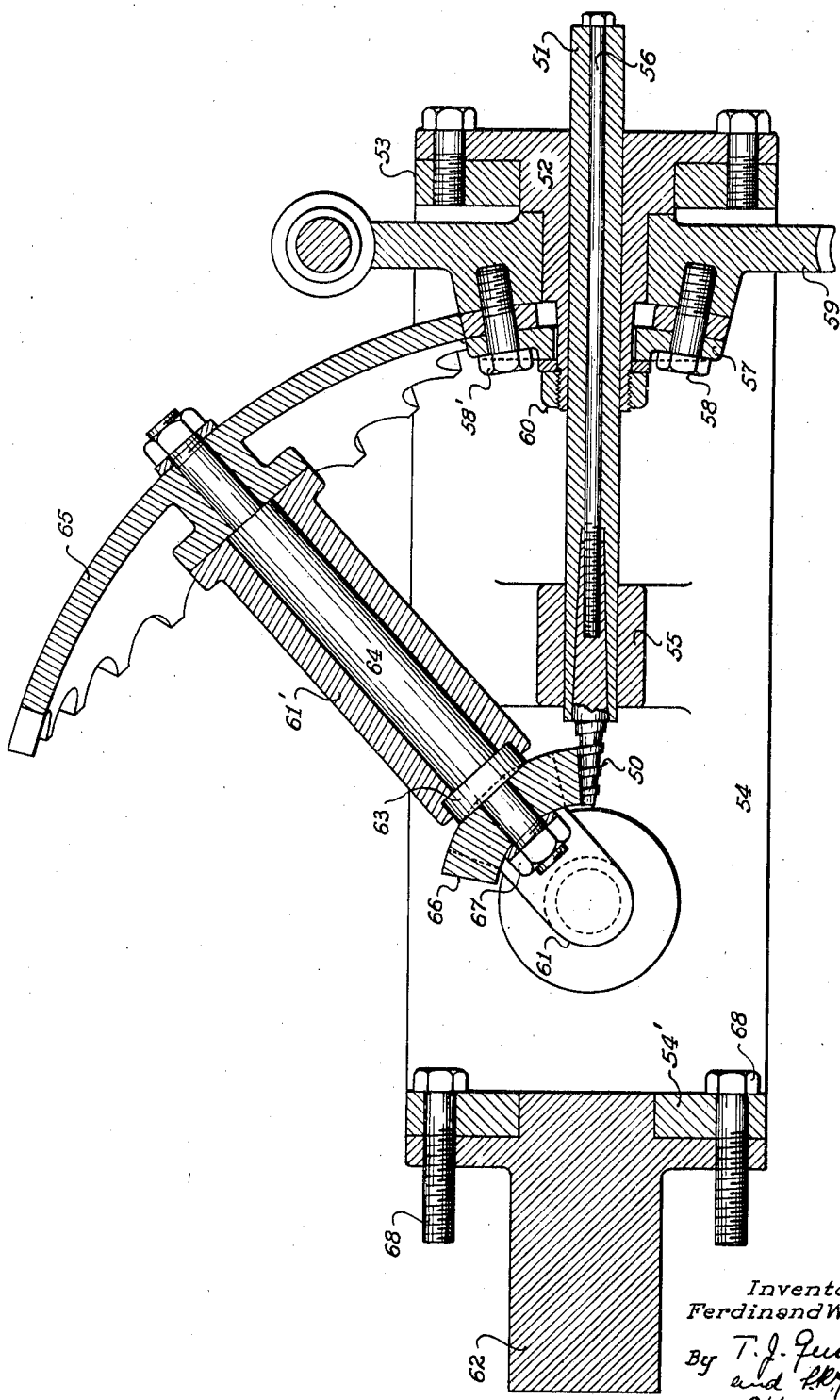
Fig. 7 is a corresponding sectional plan taken on line 7—7 of Fig. 6.

A somewhat different application of the principles of my invention is illustrated in Figs. 6 and 7. Here, the machine is designed as a gear cutting attachment for a turreth lathe, and, in addition, possesses certain advantages over the embodiment previously described. The tool 50, in this case, is secured in a long shaft 51 journaled and axially slideable in a stepped trunnion 52 secured to the end plate 53 of a frame 54 and in a bearing pedestal 55 rising from the base of said frame. The spiral milling tool 50 is held in place as before by a long cap screw 56. The rotor 57, which resembles the rotor 22 previously described and functions in like manner, is, in this modified form, secured by cap screws 58 and 58' directly to the hub of a worm gear 59, said gear being journaled for free rotation on the stepped trunnion 52 and retained against axial displacement thereon by a nut 60 threaded on the end of said trunnion, substantially as shown in Fig. 7.

An important feature of this modified form of my invention resides in the shape of the swinging column 61. This member, which is journaled to swing in a horizontal plane in the frame as before, has its middle portion bowed, in the manner illustrated in Fig. 6, toward the axis of the attached arbor 61'. At the junction of the arbor 61' with the bowed column, an annular recess provides a positive seat for an integral collar 63 formed on the spindle 64 which is journaled in the arbor and has threaded stems at the ends for supporting the template gear or pattern 65 and the pinion 66. Attention is directed to the fact that the pinion 66 is in reverse position with respect to the tool 50 from the position of the pinion 26 with its cutting tool 29 (Fig. 2). In the previous embodiment the pinion blank is seated by the contact of its inner face with the shouldered spindle. In the modified form of my device, the outer face or "back" of the pinion is clamped against the collar of the spindle by the nut 67; and, since the pitch diameter and other controlling dimensions of bevel gears are usually established and gaged from the back, this modification facilitates the accurate machining of the teeth, and the making of the proper-sized gear.

In practise, the shaft 51 carrying the milling tool 50 is clamped in the chuck of the lathe and is thereby caused to rotate at the required cutting speed within the bearings of the relatively stationary frame. The rotor 57 is slowly rotated on the stepped trunnion by suitable means (not shown) connected to the attached worm gear 59 and thus imparts rotation to the template gear or pattern 65 and pinion 66; while the pattern is rotating the arbor 61' is swung in a horizontal plane alternately toward and away from the tool 50 to form rounded teeth on the pinion 66. The entire frame 54 may be slid longitudinally on the bed of the lathe, irrespective of the tool 50, by moving the conventional turret head or other member slideably mounted on the said bed of the lathe, the frame 54 being secured to said turret member by means engaging the stub shaft 62 which is provided on the end plate 54' of the frame and/or by cap screws 68 which are set into the said end plate as shown.

While this modified form of my invention is designed primarily as an attachment for a conventional turret lathe, it is apparent that the frame 54 may be fixed to any supporting structure and the tool shaft and rotor gear driven independently by any of the well-known and standard drives.

Both devices, illustrated by Figure 2 and Figure 7, which I have shown for carrying out my invention, are adapted to cut round teeth in a bevel gear. In each case, the pivotal axis of the arbor 10' or 61' is in alignment with the axis of the cutting tool, and it will readily be seen that this is necessary in this embodiment of my invention. It will also be apparent that the location of the rounded gear blank, 26 or 66, with respect to the pivotal axis of the arbor 10' or 61' would be determined by the radius of curvature of the surface of the gear blank, the distance of the gear blank from the pivotal point being apparently equal to the radius of the curvature. The tapered edges of the cutting tool 29 or 50 are in radial alignment with the pivotal axis of the moving arbor and the size of the gear will depend on the size of the angle of intersection of the axes of the cutter and gear, this latter being in turn directly determined by the diameter of the template or pattern. Thus in the two devices illustrated in Figures 2 and 7, the size of the finished gear, as well as the number, size and shape of the teeth, are determined entirely by the template or pattern and can be modified merely by changing the template.

In both of these constructions I have shown the arbor 10' or 61' mounted to swing in a single horizontal plane, with the movement and rotation of the template caused by the rotation of the rotor element 22 or 57. It would be possible in either construction to have an arbor pivoted for universal movement and to substitute a stationary element for the rotor and make the template revolve about such element. Such motion of the template would produce rotation of the gear blank and movement of the blank alternately towards and away from the axis of the cutter, similar to that produced in the devices as shown. The constructions which I have illustrated, however, I believe to be simpler and more practical.

Various other modifications and improvements might also be made in the machine which I have shown, without changing the principles of operation. Also, while I have in general described only one type of machine for carrying out my improved method of cutting gears, this same method might be followed in other machines. Thus, for example, it would be possible to keep the position of the axis of the blank fixed during the cutting operation and change the relative position of the cutter axis instead, controlling the change in position of the latter by means of a suitable pattern similar to that already described. I believe the means which I have described is preferable, simpler, and more readily adaptable to standard forms of equipment. However, it is not my intention to limit my invention otherwise than as set forth in the attached claims.

I claim:

1. In a gear-cutting machine, a pair of rotatable shafts, the gear blank secured to one of said shafts, the cutter secured to the other of said shafts, a template gear mounted on one of said shafts, said template gear having a perimeter containing regularly-spaced teeth, the number of teeth being twice the number desired in the gear to be cut, a rotor, means on said rotor for intermittently engaging every second tooth in said template to produce rotation of said template and alternate change of position of the axis of said template, and an element on said rotor for holding said template to the proper pitch line when a tooth on said template is not being engaged by said means.

2. In a gear-cutting machine, a pair of rotatable shafts, the gear blank secured to one of said shafts, the cutter secured to the other of said shafts, a pivotally mounted arbor supporting one of said shafts, a template gear mounted on said arbor-supported shaft, the pivotal point of said arbor located in axial alignment with both shafts, said template having a perimeter containing regularly-spaced teeth, means engaging said teeth to produce rotation of said template gear and associated means for producing alternating change of position of said arbor during such rotation.

3. In a gear-cutting machine, a pair of rotatable shafts, the axes of said shafts intersecting, the angularity of the axis of one of said shafts being adjustable with respect to the axis of the other shaft, the gear blank secured to one of said shafts, the cutter secured to the other of said shafts, means for rotating said shafts, a template gear associated with said angularly adjustable shaft, a rotor engaging said template gear, said rotor so constructed and arranged that rotation of said rotor will cause rotation of said template gear and alternating movement of said template gear towards and away from the axis of said rotor, and means for holding said template gear in contact with the said rotor.

4. In a gear-cutting machine employing a rotating cutter, a pivotally mounted arbor, a shaft rotatably supported in said arbor, a template gear mounted on said arbor-supported shaft, means for rotating said template gear and for producing alternating change of position of said arbor during such rotation.

5. In an apparatus for cutting teeth in a bevel gear, a rotating member carrying a cutter, a shaft on which the gear blank is supported, a template gear carried by said shaft, rotating means engaging said template gear, said rotating means so constructed and arranged that said rotating means will cause rotation of said template gear and alternating movement of said template gear towards and away from the axis of said rotating means.

6. In an apparatus for cutting teeth in a bevel gear, a rotating tapered cutter, a shaft on which the gear blank is supported, the gear blank secured to one end of said shaft adjacent said cutter, a template gear secured to the other end of said shaft, means for rotating said template gear and associated means for producing alternating change of position of the axis of said template gear and template gear shaft during such rotation.

7. In an apparatus for cutting teeth in a bevel gear, a rotating member carrying a cutter, a pivotally mounted arbor, the pivotal point of said arbor being in alignment with the axis of said member, a shaft rotatably supported in said arbor, the gear blank secured to one end of said shaft adjacent said cutter, a template gear secured to the other end of said shaft, a rotor engaging said template gear, said rotor being in axial alignment with said cutter, and means for holding said template gear in contact with the said rotor.

8. In an apparatus for cutting teeth in a bevel gear, a rotating member carrying a spiral cutter, a swinging arbor pivotally supported for movement in the plane of said rotating member, the pivotal point of said arbor being in alignment with the axis of said member, a template gear supported by said arbor, means engaging said template gear adapted to cause rotation of said template gear and to produce uniform variation in the position of said arbor with respect to the axis of said cutter-carrying member.

FERDINAND W. SEECK.